United States Patent
Darnall et al.

(10) Patent No.: US 12,496,567 B2
(45) Date of Patent: Dec. 16, 2025

(54) POLYMER-HYDROXYAPATITE COMPOSITE MEMBRANES

(71) Applicant: BIO-RAD LABORATORIES, INC., Hercules, CA (US)

(72) Inventors: Shawn Darnall, Hercules, CA (US); Brian Panganiban, Hercules, CA (US); Danni Wang, Hercules, CA (US); Christopher Belisle, Walnut Creek, CA (US); Zachary Clauss, Hercules, CA (US)

(73) Assignee: BIO-RAD LABORATORIES, INC., Hercules, CA (US)

( * ) Notice: Subject to any disclaimer, the term of this patent is extended or adjusted under 35 U.S.C. 154(b) by 0 days.

(21) Appl. No.: 18/653,214

(22) Filed: May 2, 2024

(65) Prior Publication Data
US 2024/0367143 A1    Nov. 7, 2024

Related U.S. Application Data

(60) Provisional application No. 63/463,319, filed on May 2, 2023.

(51) Int. Cl.
*B01D 15/08* (2006.01)
*B01J 20/04* (2006.01)
(Continued)

(52) U.S. Cl.
CPC .......... *B01J 20/048* (2013.01); *B01D 15/08* (2013.01); *B01J 20/28085* (2013.01);
(Continued)

(58) Field of Classification Search
CPC .. B01J 20/048; B01J 20/28085; B01J 20/282; B01J 20/3071; B01J 20/3212;
(Continued)

(56) References Cited

U.S. PATENT DOCUMENTS

| | | | |
|---|---|---|---|
| 5,458,863 | A | 10/1995 | Klassen |
| 5,472,734 | A | 12/1995 | Perrotta et al. |

(Continued)

FOREIGN PATENT DOCUMENTS

| | | |
|---|---|---|
| CN | 102188757 A | 9/2011 |
| WO | WO 2015/134469 | 9/2015 |
| WO | WO 2021/163910 | 8/2021 |

OTHER PUBLICATIONS

Cohen, E. and E. Poverenov, "Hydrophilic chitosan derivatives: synthesis and applications", Chemistry—A European Journal, 28. (Year: 2022).*
(Continued)

*Primary Examiner* — Benjamin L Lebron
(74) *Attorney, Agent, or Firm* — SALIWANCHIK, LLOYD & EISENSCHENK

(57) ABSTRACT

Provided herein is a chromatography media composed of a porous solid substrate (such as a membrane, metal, or metallic alloy) that is coated with hydroxyapatite (HA). Also provided is a chromatography media comprising a HA-coated substrate and uses thereof. Thus this disclosure provides a chromatography media composed of a porous solid substrate (such as a membrane, metal, or metallic alloy) that is coated with HA. Also provided is a chromatography media comprising a HA-coated substrate and uses thereof. Methods of preparing the HA-coated substrate are also provided.

23 Claims, 3 Drawing Sheets

(51) Int. Cl.
| | |
|---|---|
| B01J 20/28 | (2006.01) |
| B01J 20/282 | (2006.01) |
| B01J 20/30 | (2006.01) |
| B01J 20/32 | (2006.01) |
| B01J 20/34 | (2006.01) |

(52) U.S. Cl.
CPC ......... *B01J 20/282* (2013.01); *B01J 20/3071* (2013.01); *B01J 20/3212* (2013.01); *B01J 20/3221* (2013.01); *B01J 20/3225* (2013.01); *B01J 20/3236* (2013.01); *B01J 20/3433* (2013.01); *B01J 20/3475* (2013.01); *B01J 2220/46* (2013.01); *B01J 2220/52* (2013.01)

(58) Field of Classification Search
CPC  B01J 20/3221; B01J 20/3225; B01J 20/3236; B01J 20/3433; B01J 20/3475; B01J 2220/46; B01J 2220/52; B01D 15/08
See application file for complete search history.

(56) References Cited

U.S. PATENT DOCUMENTS

| | | | |
|---|---|---|---|
| 6,153,266 | A | 11/2000 | Yokogawa et al. |
| 7,544,496 | B2 | 6/2009 | Gower et al. |
| 8,168,151 | B2 | 5/2012 | Tanaka et al. |
| 8,815,328 | B2 * | 8/2014 | Riman .................. B01J 20/048 623/23.57 |
| 9,072,813 | B2 | 7/2015 | Murphy et al. |
| 9,815,695 | B2 | 11/2017 | Cummings et al. |
| 10,166,104 | B2 | 1/2019 | Wei et al. |
| 10,500,139 | B2 | 12/2019 | Young |
| 10,814,305 | B2 | 10/2020 | Liao et al. |
| 10,926,000 | B2 | 2/2021 | Harding et al. |
| 2004/0034141 | A1 | 2/2004 | Aramaki et al. |
| 2004/0131562 | A1 | 7/2004 | Gower et al. |
| 2005/0255779 | A1 | 11/2005 | Mizutani et al. |
| 2010/0249925 | A1 * | 9/2010 | Blunn ...................... C25D 9/04 427/2.24 |
| 2013/0323812 | A1 | 12/2013 | Cummings et al. |

OTHER PUBLICATIONS

Ji, C., et al., "Enhancing cell penetration and proliferation in chitosan hydrogels for tissue engineering applications", Biomaterials, 32, pp. 9719-9729. (Year: 2011).*

Qi, P., et al., "Fabrication of calcium phosphate-loaded carboxymethyl cellulose non-woven sheets for bone regeneration", Carbohydrate Polymers, 189, pp. 322-330. (Year: 2018).*

Oprea, M., and Stefan Voicu, "Recent advances in applications of cellulose derivatives-based composite membranes with hydroxyapatite", Materials, 13, 2481. (Year: 2020).*

Miyajima, H., et al., "Microfabrication of gelatin methacrylate/ hydroxyapatite composites by utilizing alternate soaking process", ACS Biomaterials Science & Engineering, 10, pp. 762-772. (Year: 2024).*

Lijima, K., et al., "Surface functionalization of tissue culture polystyrene plates with hydroxyapatite under body fluid conditions and its effects on differentiation behaviors of mesenchymal stem cells", Colloids and Surfaces B: Biointerfaces, 147, pp. 351-359. (Year: 2016).*

Anonymous, "Ha Ultrogel Hydroxyapatite Chromatography Resin" Product Data Sheet, DIR: 2578759-000-01, Status: Jul. 2020, Sartorius, pp. 1-4.

Riau, A. K. et al. "Biomimetic vs. Direct Approach to Deposit Hydroxyapatite on the Surface of Low Melting Point Polymers for Tissue Engineering" *Nanomaterials*, Oct. 29, 2020, pp. 1-19, vol. 10.

Song, J. et al. "Mineralization of Synthetic Polymer Scaffolds: A Bottom-Up Approach for the Development of Artificial Bone" *Journal of American Chemical Society*, published on web Feb. 17, 2005, pp. 3366-3372, vol. 127.

Moleirinho, M. G. et al. "3D-printed ordered bed structures for chromatographic purification of enveloped and non-enveloped viral particles" *Separation and Purification Technology*, available online Sep. 2, 2020, pp. 1-9, vol. 254.

Leonor, I. B. et al. "Functionalization of different polymers with sulfonic groups as a way to coat them with a biomimetic apatite layer" *Journal of Materials Science: Materials in Medicine*, published online Jun. 7, 2007, pp. 1923-1930, vol. 18.

Schneider, M. et al. "Co-Deposition of a Hydrogel/Calcium Phosphate Hybrid Layer on 3D Printed Poly(Lactic Acid) Scaffolds via Dip Coating: Towards Automated Biomaterials Fabrication" *Polymers*, Mar. 7, 2018, pp. 1-19, vol. 10.

Tachaboonyakiat, W. et al. "Hydroxyapatite Formation on/in Biodegradable Chitosan Hydrogels by an Alternate Soaking Process" *Polymer Journal*, 2001, pp. 177-181, vol. 33, No. 2.

Khiri, M. Z. A. et al. "Crystallization behavior of low-cost biphasic hydroxyapatite/β-tricalcium phosphate ceramic at high sintering temperatures derived from high potential calcium waste sources" *Results in Physics*, available online Dec. 10, 2018, pp. 638-644, vol. 12.

Mobasherpour, I. et al. "Effect of Heat Treatment on Grain Growth of Nanocrystalline Hydroxyapatite Powder" *Journal of Ceramic Science and Technology*, 2011, pp. 119-124, vol. 2, No. 2.

Erickson, K. L. "Thermal Decomposition of Polymers in Nitrogen and in Air*" *International SAMPE Technical Conference*, 2007, SAND2007-5405C, pp. 1-15.

Madhavi, S. et al. "Synthesis and crystallization of macroporous hydroxyapatite" *Journal of Solid State Chemistry*, 2005, pp. 2838-2845, vol. 178.

International Search Report, Written Opinion, and Search History for International Application No. PCT/US2024/027416, Jul. 30, 2024, pp. 1-11.

* cited by examiner

POLYMER-HYDROXYAPATITE COMPOSITE MEMBRANES

CROSS-REFERENCE TO RELATED APPLICATION

This application claims the benefit of U.S. Provisional Application Ser. No. 63/463,319, filed May 2, 2023, the disclosure of which is hereby incorporated by reference in its entirety, including all figures, tables and amino acid or nucleic acid sequences.

Hydroxyapatite (HA) purification media has several drawbacks. Ceramic hydroxyapatite (CHT), for example, is complicated and expensive to produce and is difficult to pack into columns. Hydroxyapatite can be compressed during operation, affecting flow rates, causing sample dilution and a decrease in resolution with respect to protein purification. Hydroxyapatite is also difficult to pack, is also mechanically unstable, and can fragment into pieces, resulting in column pressure increases. Lastly, hydroxyapatite can dissolve at low pH, disturbing the bed during operation. This disclosure provides a new hydroxyapatite chromatography media that solves several of these drawbacks. Its production is also less complicated as compared to CHT and it can be produced at a fraction of the cost.

BRIEF SUMMARY OF THE INVENTION

Provided herein is a chromatography media composed of a porous solid substrate (such as a membrane, metal, or metallic alloy) that is coated with HA. Also provided is a chromatography media comprising a HA-coated substrate and uses thereof.

Also provided is a method of preparing the HA-coated substrate. In some embodiments, the method comprises oxidizing or phosphorylating a substrate comprising of hydroxyl groups, to form a substrate bearing carboxyl or phosphate groups. The derivatized substrate can then be mineralized with calcium phosphate to form a substrate coated with calcium phosphate (e.g., a brushite form of calcium phosphate). The calcium phosphate can then be treated with a base (such as sodium hydroxide) to form the HA-coated substrate. FIG. 1 illustrates one embodiment of this process.

Also provided are methods of performing chromatography. In some embodiments, the method comprises contacting a sample comprising a target molecule with a HA-coated substrate as disclosed herein under conditions such that the target is not captured by the HA-coated substrate; and collecting the target molecule in flow-through from the HA-coated substrate.

In other embodiments, the method comprises contacting a sample comprising a target molecule with a HA-coated substrate as disclosed herein under conditions such that the target is captured by the HA-coated substrate; and collecting the target molecule in an eluate from the HA-coated substrate.

In some embodiments, the sample comprises a contaminant that is captured by the HA-coated substrate. In some embodiments, the collecting step comprises collecting one or more fractions enriched for the target molecule from the HA-coated substrate. In other embodiments, the collecting step comprises applying centrifugal force or a vacuum to the HA-coated substrate and collecting one or more fractions enriched for the target molecule from the HA-coated substrate. In some embodiments, the protein is an antibody or another therapeutic protein. In some embodiments, the protein is an IgG antibody.

DETAILED DESCRIPTION OF THE INVENTION

Figure 1:
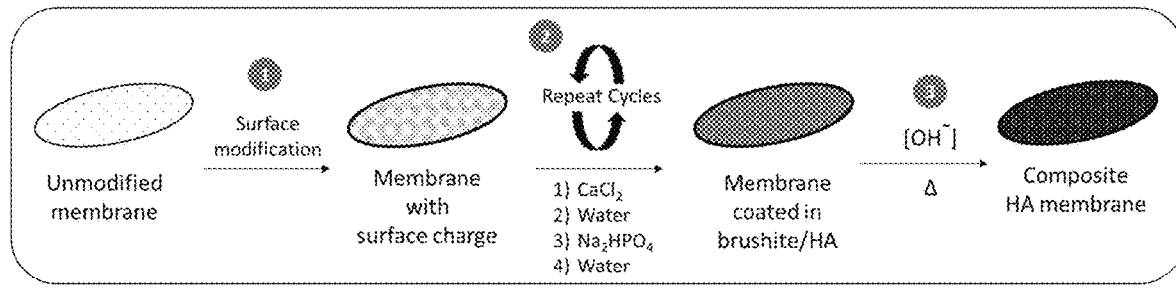
FIG. 1 illustrates an exemplary method by which HA can be formed on a substrate.

This disclosure relates to HA-coated substrates, methods of making HA-coated substrates, and methods of using HA-coated substrates.

Definitions

The term "hydroxyapatite" refers to an insoluble hydroxylated mineral of calcium phosphate with the structural formula $Ca_{10}(PO_4)_6(OH)_2$. Hydroxyapatite chromatography is considered a multimodal process in that it has multiple modes of interaction with biomolecules. Its dominant modes of interaction are phosphoryl cation exchange and calcium metal affinity. Hydroxyapatite is commercially available in a variety of forms including, but not limited to, ceramic hydroxyapatite which is a chemically pure form of hydroxyapatite that has been sintered at high temperature to modify it from a crystalline to a ceramic form. Ceramic hydroxyapatite is spherical in shape, with particle diameters ranging from about 10 microns to about 100 microns, and is typically available at nominal diameters of 20 microns, 40 microns, and 80 microns. Ceramic hydroxyapatite (or CHT) is macroporous, and is available in three types: Type I, with a medium porosity and a relatively high binding capacity, and Type II, with a larger porosity and a lower binding capacity, and XT, which has properties between Type I and Type II. All of the apatite-based HA-coated substrates in this paragraph are available from Bio-Rad Laboratories, Inc. (Hercules, Calif., USA).

The term "antibody" refers to an immunoglobulin or fragmentary form thereof. The term includes, but is not limited to, polyclonal or monoclonal antibodies of the classes IgA, IgD, IgE, IgG, and IgM, derived from human or other mammalian cell lines, including natural or genetically modified forms such as humanized, human, single-chain, chimeric, synthetic, recombinant, hybrid, mutated, grafted, and in vitro generated antibodies. "Antibody" encompasses composite forms including, but not limited to, fusion proteins containing an immunoglobulin moiety. "Antibody" also includes antibody fragments such as Fab, F(ab')2, Fv, scFv, Fd, dAb, Fc and other compositions, whether or not they retain antigen-binding function.

The term "protein" is used to denote an amino acid polymer or a set of two or more interacting or bound amino acid polymers. The term applies to amino acid polymers in which one or more amino acid residue is an artificial chemical mimetic of a corresponding naturally occurring amino acid, as well as to naturally occurring amino acid polymers, those containing modified residues, and non-naturally occurring amino acid polymers. The term "protein" includes therapeutic proteins, including, but are not limited to, Factor VIII von Willebrand Factor enzymes, growth regulators, clotting factors, cytokines, hormones, transcription factors and phosphoproteins.

The term "HA-coated substrate" as referred to within this disclosure is meant to denote a substrate that is coated with HA.

The term "sample" refers to any composition containing a target molecule that is desired to be purified. The term "contaminant" refers to any impurity that is to be removed from a sample. In some embodiments, the sample is a composition comprising antibodies and other contaminating proteins from a cell culture.

As used herein, the terms "a", "an" and "the" are intended to mean "one or more." As used herein, the term "about" refers to the recited number and any value within 10% of the recited number. Thus, "about 5" refers to any value between 4.5 and 5.5, including 4.5 and 5.5.

The term "and/or" as used herein refers to and encompasses any and all possible combinations of one or more of the associated listed items. For example, the phrase "A, B, and/or C" includes A alone, B alone, C alone, the combination of A and B, the combination of A and C, the combination of B and C, and the combination of A, B, and C. Also, the term "or" is used in its inclusive sense (and not in its exclusive sense) so that when used, for example, to connect a list of items, the term "or" means one, some, or all of the items in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z).

The term "substrate" refers to a solid, porous (microporous or macro-porous) substrate. The substrate can be a membrane, such as nitrocellulose, cellulose, polyethersulfone, or nylon, or a solid substance, such as glass, a metal or metallic alloy. Specifically excluded as a solid substrate are particulate substrates, such as beads or other particulate substrates. Solid substrates are coated with calcium and phosphate to form HA. The substrate can be derivatized to contain a charged functional group such as phosphate group, sulfate group, carboxylic acid group, sulfonate group, and/or quaternary amine group. Substrates can also comprise a phosphate group, sulfate group, carboxylic acid group, sulfonate group, and/or quaternary amine group attached to a linker coupled to the substrate. Substrates can be formed from cellulose, nitrocellulose cellulose acetate, or any other suitable material that can be derivatized to have an strong or weak ionic group exposed on the surface of the substrate. Porous substrates can contain pores of any desired size. For example, the pores can have a median diameter of about 0.2 micron or greater or the pores can have a median diameter less than about 0.5 micron or about 0.1 micron. In some embodiments, the median diameter of the pores can range between about 0.1 micron to about 100 micron or between about X and about 100 micron, where X is an integer between 1 and 99. In some embodiments, the substrate can be macroporous and have a pore diameters of about 50 nm to about 100 nm. Larger pores are preferred to prevent pore inaccessibility during and after hydroxyapatite deposition, as well as to reduce backpressure.

Methods

Protein purification utilizing a HA-coated substrate in accordance can be achieved by conventional means known to those of skill in the art. Examples of proteins include but are not limited to antibodies, enzymes, growth regulators, clotting factors, transcription factors, and phosphoproteins. In many such conventional procedures, the HA-coated substrate prior to use is equilibrated with a buffer ("an equilibration buffer") at the pH that will be used for the binding of the target molecule (e.g., antibody or non-antibody protein). Equilibration can be done with respect to all features that will affect the binding environment, including ionic strength and conductivity when appropriate.

In some embodiments, the HA-coated substrates described herein can be used in "bind-elute" mode to purify a target molecule from a biological sample. In some embodiments, following binding of the target molecule to the HA-coated substrate, a change in phosphate concentration pH can be used to elute the target molecule.

In some embodiments, once the HA-coated substrate is equilibrated, the sample containing a target molecule is loaded onto the HA-coated substrate (a "loading step"), the sample optionally being diluted or equilibrated into the equilibration buffer) and the target molecule is allowed to bind to the HA-coated substrate. Once bound to the HA-coated substrate, the HA-coated substrate can be washed with a "wash buffer" to remove contaminants not bound to the HA-coated substrate.

Non-limiting examples of buffers suitable for use in connection with chromatography using the disclosed particulate HA-coated substrate include phosphate buffers (e.g., monosodium, disodium, and/or trisodium phosphate buffers), ammonium phosphate, calcium phosphate, and potassium phosphate (monobasic and/or dibasic) buffers. Other non-limiting examples of buffers suitable for use in connection with the disclosed chromatography substrate include acetate buffers (e.g., sodium acetate), acetic acid, malonic acid, succinate buffers, imidazole buffers, arginine buffers, glycine buffers, HEPES (2-[4-(2-hydroxyethyl)piperazin-1-yl]ethanesulfonic acid), BICINE (N,N-Bis(2-hydroxyethyl)glycine), Bis-tris (Bis-tris methane), Bis-tris propane, TRIS (Tris(hydroxymethyl)aminomethane), MES (2-Morpholinoethanesulfonic acid monohydrate or ACES (N-(2-Acetamido)-2-aminoethanesulfonic acid) buffers. The buffers are, generally, prepared at concentrations of about 5 mM to about 75 mM, about 5 mM to about 50 mM or about 20-50 mM, 5 mM to about 100 mM, or 10 mM to about 100 mM. Each of these buffers can contain calcium and/or phosphate ions, for example at a concentration of about 1 mM to about 50 mM, 1 mM to about 40 mM, 1 mM to about 30 mM, 1 mM to about 20 mM, 1 mM to about 10 mM, or 1 mM to about 5 mM. These buffers, may, optionally, further comprise a salt. Examples of salts that can be used for this purpose are alkali metal and alkaline earth metal halides, notably sodium and potassium halides, and as a specific example NaCl or KCl. Other salts include sulfates, acetates, bromides, perchlorates, iodides, thiocyanates and suitable cations, such as ammonium, alkali metals and alkaline earth metals.

Alternatively, conditions and reagents that are used as in standard HA-based chromatography can be used with the disclosed HA-coated substrates. For example, any buffer can be used, such as those containing cations such as sodium, potassium, ammonium, magnesium, and calcium, and anions such as chloride, fluoride, acetate, phosphate, and citrate. The pH of the equilibration solution is typically about 6.0 or higher, in many cases the pH is within the range of about 6.5 to about 8.6 or a range of about 6.5 to about 7.8. In some embodiments, equilibration of a HA-coated substrate as disclosed herein may take place in a solution comprising a Tris or a sodium phosphate buffer. The sodium phosphate buffer may be, for example, present at a concentration from about 0.5 mM to about 50 mM, or from about 5 mM to about 35 mM.

In some embodiments, the HA-coated substrate may be washed with a wash buffer, such as the equilibration buffer, to remove any unbound proteins or substances that may have been present in the source liquid. The bound protein (e.g., antibody or non-antibody protein, as desired) can be subsequently eluted with an elution buffer. Isocratic elution, stepwise elution in which buffer conditions or salt conditions are changed, or gradient elution using, for example, a buffer at a constant pH and a salt gradient or a gradient of phosphate ions can be used for eluting a protein of interest.

In other embodiments, the binding and washing steps are performed with the inclusion of at least one salt in the sample and wash liquids. Examples of salts that can be used for this purpose are alkali metal and alkaline earth metal halides, notably sodium and potassium halides, and as a specific example sodium chloride. The concentration of the salt can vary; in most cases, an appropriate concentration will be one within the range of about 10 mM to about 2 M, about 10 mM to about 1.5 M, about 10 mM to about 1 M, about 10 mM to about 750 mM, about 10 mM to about 500 mM, about 10 mM to about 250 mM, about 20 mM to about 150 mM, about 20 mM, or about 150 mM.

Other embodiments contemplate the use of different concentrations of phosphate ions in the binding and elution steps. In some embodiments, the concentration to phosphate ions ranges: between X mM and 1000 mM, where X is any integer between 1 and 999; between X mM and 750 mM, where X is any integer between 1 and 749; between X mM and 500 mM, where X is any integer between 1 and 499; between X mM and 250 mM, where X is any integer between 1 and 249; between X mM and 100 mM, where X is any integer between 1 and 99; between X mM and 50 mM, where X is any integer between 1 and 49. Optimal elution conditions for some proteins can involve a buffer with a higher salt concentration or a higher concentration of phosphate ions than that of the loading and/or wash buffer. In some instances, bound proteins can be eluted with a salt or phosphate gradient (see, for example, the examples provided herein). In other embodiments, a stepwise elution can be utilized in which the amount of salt or phosphate contained within a buffer is altered (e.g., increased) and passed over the substrate to elute bound protein.

The HA-coated substrate can be utilized in any conventional configuration. For example, a sample can be passed over or through a HA-coated substrate (or contacted with a HA-coated substrate) and washed and/or eluted.

The output from the HA-coated substrate can be monitored for the presence of the target molecule or other components of the sample, as desired, to determine fractions that contain the target molecule and that are free, or at least have a reduced amount, of contaminant compared to the original sample. In some embodiments, at least 90%, 95%, 99% of the contaminant in the sample is removed in the resulting purified target molecule fractions. An exemplary method for measuring output includes monitoring a characteristic absorbance wavelength for the target molecule. The term "fraction" is used to refer to a portion of the output of chromatography and is not intended to limit how the output is collected or whether the output is collected in parts or continuously.

Any antibody preparation can be used in the present invention, including unpurified or partially purified antibodies from natural, synthetic, and/or recombinant sources. Unpurified antibody preparations can come from various sources such as, for example, plasma, serum, ascites, milk, plant extracts, bacterial lysates, yeast lysates, or conditioned cell culture media. Partially purified preparations can come from unpurified preparations that have been processed by at least one chromatography, precipitation, other fractionation step, or any combination thereof. In some embodiments, the antibodies have not been purified by protein A affinity prior to purification.

In certain embodiments, the HA-coated substrates can be used for purification of non-antibody proteins, including therapeutic proteins. Examples of therapeutic proteins include, but are not limited to, Factor VIII von Willebrand Factor enzymes, growth regulators, clotting factors, transcription factors and phosphoproteins.

Producing HA-Coated Substrates

In general terms, a hydroxyapatite (HA)-coated substrate can be produced in the following generalized method. First, a desired solid substrate is chosen based on its chemical and mechanical properties. The solid support can be functionalized to facilitate growth of a calcium phosphate (CaP) coating throughout and on the surface of the substrate via alternating exposures to calcium ion containing solutions, washes, and phosphate containing solutions. Finally, the CaP layer is converted to hydroxyapatite via exposure to a strong base, optionally at elevated temperatures, for a specified amount of time. Exemplary strong bases include, and are not limited to, LiOH, NaOH, KOH, RbOH, CsOH, $Ca(OH)_2$, $Sr(OH)_2$, and $Ba(OH)_2$. Considerations for each of these steps is as follows:

The substrate for the HA-coated substrate includes those substrates with high surface area (and are preferred) but the HA-coated substrate can also be made from substrates having low porosity. Polar functionality or preferably surface charge can be incorporated into or onto the substrate (for example, by oxidation of the substrate). Alternatively, polarity or surface charge can be introduced via chemical modifications, for example coupling ligands to the substrate. Types of surface charges include but are not limited to strong cation exchange ligands like sulphonates, strong anion exchange ligands like quaternary amines, and weak cation exchange groups like carboxylic acids, sulphates, and phosphates.

The method used to grow the CaP layer involves cyclic exposures of the substrate to solutions of calcium ions, washes, phosphate ions, and further washes. Various types of calcium ion-containing and phosphate ion-containing solutions can be prepared. The calcium source is a solubilized salt of calcium and is selected to reduce the amount of undesired impurities. The preferred calcium source is calcium chloride. Other non-limiting examples of calcium salts include calcium carbonate, calcium citrate, and calcium nitrate. Calcium solutions of varying concentrations can be used, ranging but not limited to 50-1000 mM. Some embodiments utilize calcium concentrations between about 250 mM and about 500 mM. Solutions can be made of varying concentrations, ranging from but not limited to 10 mM to about 1000 mM, about 20 mM to about 750 mM, about 30 mM to about 500 mM, about 30 mM to about 400 mM, or a concentration of about 300 mM. Alternatively, the calcium solutions have a concentration between about 10 mM and about A mM, wherein A is any integer between 11 and 1000. Buffers that do not form insoluble salts with calcium can be incorporated, but a preferred solution contains only the chosen calcium salt.

The phosphate source can be any solubilized salt of phosphate and is selected to reduce the amount of undesired ions and other small molecules. A preferred phosphate source is dibasic sodium phosphate heptahydrate. The anhydrous form, as well as the potassium and ammonium salts, are also compatible. Phosphate solutions can be made of varying concentrations, ranging from but not limited to 10 mM to about 1000 mM, about 20 mM to about 750 mM, about 30 mM to about 500 mM, about 30 mM to about 400 mM, or a concentration of about 300 mM and may be, optionally, heated to a temperature of about 40° C. to about 100° C., about 45° C. to about 90° C., about 50° C. to about 80° C., or about 70° C. Alternatively, the phosphate solutions have a concentration between about 10 mM and about B mM, wherein B is any integer between 11 and 1000 and may be, optionally, heated to a temperature of about 40° C. to about 100° C., about 45° C. to about 90° C., about 50° C. to about 80° C., or about 70° C. Buffers that do not form insoluble precipitates with phosphates can be incorporated, but the preferred solution contains only the chosen phosphate salt.

For the deposition process, substrates are exposed to the following cycles. For cationic substrates, CaP coatings were grown by repeatedly exposing the substrate to: (a) calcium solution, (b) water washes, (c) phosphate solution, and (d) water washes. For anionic substrates, CaP coatings were grown by repeatedly exposing the substrate to the following cycle of solutions: (a) phosphate solution, (b) water washes, (c) calcium solution, and (d) water washes. Switching these methods can be done but typically the first half does not contribute significantly to CaP growth. For polar, non-ionically charged surfaces, either process can be used.

Different configurations can be used to expose the raw substrate to the various aqueous environments if the substrate can be washed well between the calcium and phosphate solution exposures. Two configurations are a pumping format and the reactor format. In the pumping format, the substrate is placed within a holder and the appropriate solutions are passed onto and through the substrate. Different parameters can be varied including the concentrations of calcium and phosphate solutions, flowrate, number of cycles, and type of substrate used.

For the reactor format, the substrate is placed in a reactor, preferably containing a fritted drain. For each step, either the calcium solution, phosphate solution, or water wash is added to the reactor. After agitating the mixture by mechanical stirring, shaking, swirling, or bubbling, the solution or water wash is removed from the substrate. Various parameters can be changed to affect the amount of growth, morphology, and impurities/unwanted CaP debris. Parameters include, frit size and morphology, contact time with each solution, volume and concentrations of salt solutions, washing method (e.g. number, volume, duration), number of overall cycles, and method to agitate the substrate within the solution.

Conversion of the CaP to hydroxyapatite can be performed in a heated solution of a strong base, such as sodium hydroxide with agitation. Strong base (e.g., NaOH) concentration, time, and temperature, can be adjusted to alter the degree of conversion of the CaP layer into hydroxyapatite.

HA-coated substrates can be produced by contacting a solid substrate comprising a functional group with a series of solutions. The functional group associated with the substrate can be a weak cation exchange group (such as a sulfate group, a carboxylate group, a phosphate group), weak anion exchange group (amine), or any strong cationic group such as a sulfonate, or strong anionic group such as a quaternary amine (see, for example, FIG. 1). Methods of producing HA-coated substrates comprise:

a) contacting a solid substrate comprising a hydroxyl group, amine group, quaternary amine group, aldehyde group, azide group, alkyne group, alkene group, phosphate group, sulfonate group, sulfate group, and/or carboxylic acid group with a solution comprising calcium ions, with the proviso that if a substrate comprises positively charged groups it may be contacted with a phosphate containing solution and washed prior to contact with a solution comprising calcium ions;

b) washing the solid substrate contacted with calcium ions (for example, water);

c) contacting the washed solid substrate of step b) with a solution comprising phosphate ions, such as the sodium salt of phosphoric acid ($Na_2HPO_4$) to form a solid substrate coated with a brushite form of calcium phosphate;

d) washing the solid substrate of step c) with a solution (for example, water); and e) optionally repeating steps b), c), and d). When step e) is repeated, it can be repeated any number of times until a suitably HA-coated substrate is obtained. For example, step e) can be repeated Y times, where Y is any integer between 1 and 5000. In some embodiments, Y is an integer between 1 and 100, 1 and 50, 1 and 20, or 1 and 10. After the final step, for example step e), is completed, the brushite-coated substrate is treated with a base, such as sodium hydroxide and heat (for example temperatures of about 55° C. to about 100° C., about 60° C. to about 90° C., about 65° C. to about 80° C., or about 70° C.) to form a hydroxyapatite-coated substrate (HA-coated substrate).

In other embodiments, when the HA-coated substrate starts with a substrate that comprises positively charged groups, the method comprises: a) contacting the solid porous substrate with a solution comprising phosphate ions; b) washing the solid porous substrate contacted with the solution comprising phosphate ions; c) contacting the solid porous substrate of step b) with a solution comprising calcium ions; d) washing the solid substrate contacted with the solution comprising calcium ions with a wash solution; e) contacting the washed solid substrate of step b) with a solution comprising phosphate ions to form a solid substrate coated with a brushite form of calcium phosphate; f) washing the solid substrate of step c) with a solution to form a brushite-coated substrate; g) optionally repeating steps c), d), e), and f); h) treating the brushite coated substrate with a base to form a HA-coated substrate, with the proviso that the substrate is not a particulate substrate.

In instances where the solid substrate comprises an epoxide group, the epoxide-bearing substrate can be contacted with phosphoric acid, carboxylic acid, or sulfuric acid to form a substrate bearing phosphate, carboxylate, or sulfate groups. In such methods, the epoxide-bearing substrate is contacted with phosphoric acid, carboxylic acid, or sulfuric acid at a temperature of about 55° C. to about 100° C., about 60° C. to about 90° C., about 65° C. to about 80° C., or about 70° C. in order to form a substrate comprising bearing phosphate, carboxylate, or sulfate groups. These substrates can then be used in step a) of the method described above to form a HA-coated substrate.

ADDITIONAL DISCLOSURE AND CLAIMABLE SUBJECT MATTER

1. A hydroxyapatite (HA)-coated substrate made by a method comprising:
   a) contacting a solid porous substrate comprising a hydroxyl group, amine group, quaternary amine group, aldehyde group, azide group, alkyne group, alkene group, phosphate group, sulfonate group, sulfate group, and/or carboxylic acid group with a solution comprising calcium ions, with the proviso that if a substrate comprises positively charged groups it may be contacted with a phosphate containing solution and washed prior to contact with a solution comprising calcium ions;
   b) washing the solid substrate contacted with the solution comprising calcium ions with a wash solution;
   c) contacting the washed solid substrate of step b) with a solution comprising phosphate ions to form a solid substrate coated with a brushite form of calcium phosphate;
   d) washing the solid substrate of step c) with a solution to form a brushite-coated substrate; and
   e) optionally contacting the solid substrate of step d) with a solution comprising calcium ions and repeating steps b), c), and d); and
   f) treating the brushite coated substrate with a base to form a HA-coated substrate, with the proviso that the substrate is not a particulate substrate.

2. The HA-coated substrate of embodiment 1, wherein said substrate comprises positively charged groups and the method comprises:
   a) contacting the solid porous substrate with a solution comprising phosphate ions;
   b) washing the solid porous substrate contacted with the solution comprising phosphate ions;
   c) contacting the solid porous substrate of step b) with a solution comprising calcium ions;
   d) washing the solid substrate contacted with the solution comprising calcium ions with a wash solution;
   e) contacting the washed solid substrate of step b) with a solution comprising phosphate ions to form a solid substrate coated with a brushite form of calcium phosphate;
   f) washing the solid substrate of step c) with a solution to form a brushite-coated substrate; and
   g) optionally repeating steps c), d), e), and f); and
   h) treating the brushite coated substrate with a base to form a HA-coated substrate, with the proviso that the substrate is not a particulate substrate.

3. The HA-coated substrate of embodiment 1 or embodiment 2, wherein when step 1e) or step 2g) is repeated, it is repeated Y times, where Y is any integer between 1 and 5000, Y is an integer between 1 and 100, Y is an integer between 1 and 50, Y is an integer between 1 and 20, or Y is an integer between 1 and 10.

4. The HA-coated substrate of any one of embodiments 1-3, wherein the substrate comprises cellulose, nitrocellulose, nylon, glass, methacrylate, polystyrene, polyethersulfone, or mixtures thereof.

5. The HA-coated substrate of any one of embodiments 1-4, wherein the substrate is macroporous.

6. The HA-coated substrate of any one of embodiments 1-4, wherein the substrate has a pore diameter of about X to about 100 microns, wherein X is any integer between 1 and 99.

7. The HA-coated substrate of any one of embodiments 1-6, wherein the substrate is washed with water.

8. The HA-coated substrate of any one of embodiments 1-6, wherein the substrate comprises a sulfate group.

9. The HA-coated substrate of any one of embodiments 1-6, wherein the substrate comprises a carboxylate group.

10. The HA-coated substrate of any one of embodiments 1-6, wherein the substrate comprises a phosphate group.

11. The HA-coated substrate of any one of embodiment 1-10, wherein the solution comprising phosphate ions is a sodium salt of phosphoric acid ($Na_2HPO_4$).

12. The HA-coated substrate of any one of embodiments 1-11, wherein the solution comprising calcium ions is $CaCl_2$.

13. The HA-coated substrate of any preceding embodiment, wherein the calcium solution has a concentration between: about 50 to about 1000 mM; about 250 mM and about 500 mM; about 10 mM to about 1000 mM; about 20 mM to about 750 mM; about 30 mM to about 500 mM; about 30 mM to about 400 mM; about 10 mM and about A mM, wherein A is any integer between 11 and 1000; or about 300 mM.

14. The HA-coated substrate of any preceding embodiment, wherein the phosphate solution has a concentration between: about 10 mM to about 1000 mM; about 20 mM to about 750 mM; about 30 mM to about 500 mM; about 30 mM to about 400 mM; about 10 mM and about B mM, wherein B is any integer between 11 and 1000.

15. The HA-coated substate of any preceding embodiment, wherein the substrate comprises glass, metal, a metallic alloy, nylon, polystyrene, cellulose, polyethersulfone, or nitrocellulose.

16. The HA-coated substrate of embodiment 15, wherein the substrate comprises glass, a metal or metallic alloy.

17. The HA-coated substrate of any one of embodiments 1-16, wherein brushite is converted to HA by treating the brushite-coated substrate with NaOH.

18. The HA-coated substrate of embodiment 17, wherein the brushite-coated substrate is treated with NaOH and heated to a temperature of about 55° C. to about 100° C., about 60° C. to about 90° C., about 65° C. to about 80° C., or about 70° C.

19. The HA-coated substrate of embodiment 18, wherein the brushite-coated substrate is treated with NaOH and heated to a temperature of temperature of about 70° C.

20. A chromatography material comprising a HA-coated substrate according to any one of embodiments 1-19.

21. A method of performing chromatography, the method comprising:
   contacting a sample comprising a target molecule to a HA-coated substrate according to any one of embodiments 1-19 under conditions such that the target is not captured by the HA-coated substrate; and
   collecting the target molecule from eluate that has flowed through the of HA-coated substrates.

22. The method of embodiment 21, wherein the sample comprises a contaminant that is captured by the HA-coated substrates.

23. The method of embodiment 21, wherein the collecting step comprises applying centrifugal force or a vacuum to the HA-coated substrates and collecting one or more fractions enriched for the target molecule.

24. The method of embodiment 18, wherein the target molecule is an IgG antibody.

25. A method of performing chromatography, the method comprising:
  contacting a sample comprising a target molecule to a HA-coated substrate according to any one of embodiments 1-19 under conditions such that the target molecule is captured by the HA-coated substrate;
  optionally washing the HA-coated substrates with a buffer; and eluting and collecting the target molecule.

26. The method of embodiment 25, wherein the target molecule is an IgG antibody.

27. A method of making a hydroxyapatite (HA)-coated substrate comprising:
  a) contacting a solid porous substrate comprising a hydroxyl group, amine group, quaternary amine group, aldehyde group, azide group, alkyne group, alkene group, phosphate group, sulfonate group, sulfate group, and/or carboxylic acid group with a solution comprising calcium ions;
  b) washing the solid substrate contacted with solution of calcium ions with a wash solution;
  c) contacting the washed solid substrate of step b) with a solution comprising phosphate ions to form a solid substrate coated with a brushite form of calcium phosphate;
  d) washing the solid substrate of step c) with a solution to form a brushite-coated substrate; and
  e) optionally repeating steps b), c), and d); and
  f) treating the brushite coated substrate with a base to form a HA-coated substrate, with the proviso that the substrate is not a particulate substrate.

28. The method of embodiment 27, wherein when step e) is repeated, it is repeated Y times, where Y is any integer between 1 and 5000, Y is an integer between 1 and 100, Y is an integer between 1 and 50, Y is an integer between 1 and 20, or Y is an integer between 1 and 10.

29. The method of any one of embodiments 27-28, wherein the substrate comprises methacrylate, polystyrene, nitrocellulose, cellulose nylon, glass, a metal or a metallic alloy.

30. The method of any one of embodiments 27-29, wherein the substrate is porous.

31. The method of any one of embodiments 27-29, wherein the substrate is macroporous.

32. The method of any one of embodiments 27-31, wherein the substrate is washed with water in steps b) and/or c).

33. The method of any one of embodiments 27-31, wherein the substrate comprises a sulfate group.

34. The method of any one of embodiments 27-32, wherein the substrate comprises a carboxylate group.

35. The method of any one of embodiments 27-32, wherein the substrate comprises a phosphate group.

36. The method of any one of embodiments 27-35, wherein the solution comprising phosphate ions is a sodium salt of phosphoric acid ($Na_2HPO_4$).

37. The method of any one of embodiments 27-36, wherein the solution comprising calcium ions is $CaCl_2$.

38. The method of any one of embodiments 27-37, wherein the calcium solution has a concentration between: about 50 to about 1000 mM; about 250 mM and about 500 mM; about 10 mM to about 1000 mM; about 20 mM to about 750 mM; about 30 mM to about 500 mM; about 30 mM to about 400 mM; about 10 mM and about A mM, wherein A is any integer between 11 and 1000; or about 300 mM.

39. The method of any one of embodiments 27-37, wherein the phosphate solution has a concentration between: about 10 mM to about 1000 mM; about 20 mM to about 750 mM; about 30 mM to about 500 mM; about 30 mM to about 400 mM; about 10 mM and about B mM, wherein B is any integer between 11 and 1000.

40. The method of any one of embodiments 27-39, wherein brushite is converted to HA by treating the brushite-coated substrate with NaOH.

41. The method of embodiment 40, wherein the brushite-coated substrate is treated with NaOH and heated to a temperature of about 55° C. to about 100° C., about 60° C. to about 90° C., about 65° C. to about 80° C., or about 70° C.

42. The method of embodiment 41, wherein the brushite-coated substrate is treated with NaOH and heated to a temperature of temperature of about 70° C.

All patents, patent applications, provisional applications, and publications referred to or cited herein are incorporated by reference in their entirety, including all figures and tables, to the extent they are not inconsistent with the explicit teachings of this specification.

Example 1—Generalized Materials and Methods

CaP Growth onto Regenerated Cellulose Using Reactor Format

Commercially available 0.45 µm regenerated cellulose membranes were oxidized using (2,2,6,6-Tetramethylpiperidin-1-yl)oxyl or (2,2,6,6-tetramethylpiperidin-1-yl)oxidanyl (TEMPO), NaBr, and NaOCl using methods known to those in the art. The resulting membrane had a surface coated with carboxylic acid groups.

The oxidized membrane underwent 5 cycles of CaP growth. Each cycle consisted of: (1) 5 min exposure to 200 mM CaCl2 pH 7.4 in a reactor with agitation, (2) washes with water using a fritted funnel, (3) 5 minute exposure to 120 mM Na2HPO4 in a reactor with agitation, and (4) washes with water using a fritted funnel.

Figure 2:
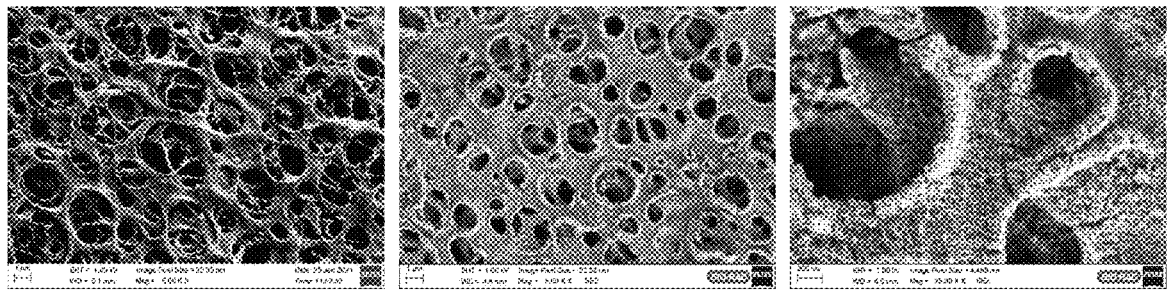
FIG. 2. CaP growth onto regenerated cellulose using reactor format. (Left) Oxidized cellulose membrane, (Center) Surface of CaP coated membrane, and (Right) zoomed in image of CaP coated oxidized cellulose membrane.

SEM images, as shown in FIG. 2 show the growth of calcium phosphate on the surface of the oxidized membrane.

Example 2

CaP Growth on a Commercial, Polyethersulfone-Based Ion Exchange Membrane in Cartridge Format 2 different commercial ion exchange chromatography membrane cartridges based on polyethersulfone with a bed volume of 0.86 mL were chosen as the base membranes. One cartridge was functionalized with a quaternary amine ("Q") ligand and the other one with a sulphonate ligand ("S") ligand. The membranes were modified separately. To grow the CaP coating, the membrane cartridge was connected to a two-pump chromatography system. Pump A had two different solutions, (A1) 500 mM CaCl2)+100 mM tris, pH 8 and (A2) water. Pump B had two different solutions, (B1) 300 mM Na2PO4 and (B2) water. The membrane cartridge underwent 60 cycles of the following conditions. For the Q Membrane:

1. Solution B1 (Na2HPO4): 7 mL at 1 mL/min, followed by a 3 min hold.
2. Washing with B2 until the conductivity was less than 0.3 mS/cm.
3. Solution A1 (CaCl2)+tris): 7 mL at 1 mL/min, followed by a 3 min hold.
4. Washing with A2 until the conductivity was less than 0.3 mS/cm.

Figure 3:
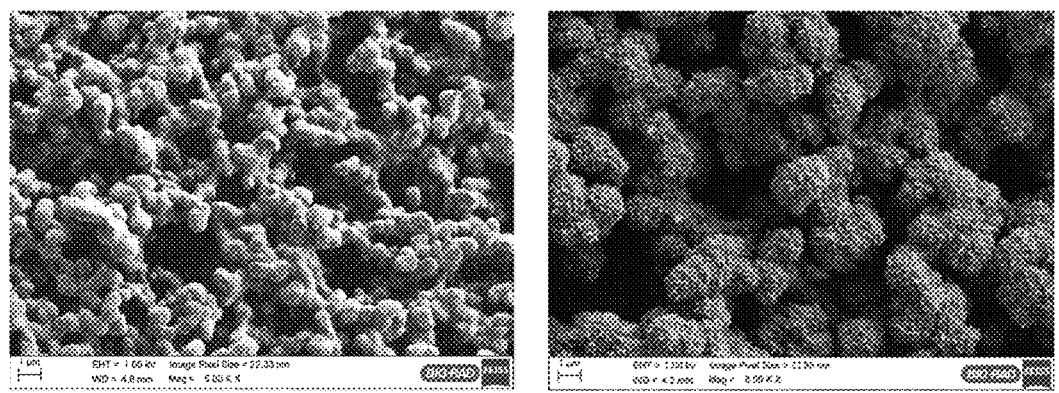
FIG. 3. CaP growth on a commercial, polyethersulfone-based ion exchange membrane in cartridge format. Q membrane is as the base membrane. 5,000× magnification of (Left) unmodified commercial chromatography membrane with quaternary amine ligands, and (Right) the same base membrane coated in CaP.

FIG. 3 shows SEM images of the Q membrane before and after modification, clearly showing the membrane surface is coated in CaP.

for the S Membrane:
1. Solution A1 (CaCl2)+tris): 7 mL at 1 mL/min, followed by a 3 min hold.
2. Washing with A2 until the conductivity was less than 0.3 mS/cm.
3. Solution B1 (Na2HPO4): 7 mL at 1 mL/min, followed by a 3 min hold.
4. Washing with B2 until the conductivity was less than 0.3 mS/cm.

Figure 4:
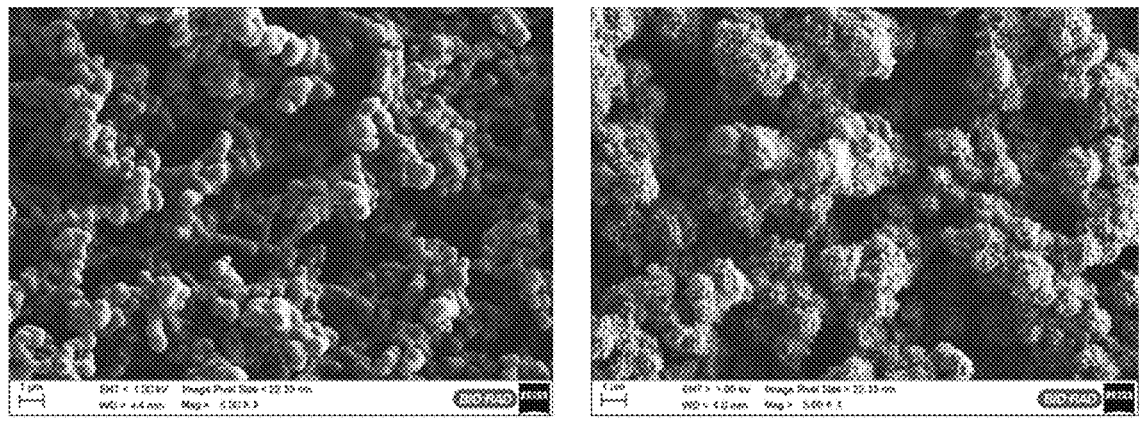
FIG. 4. CaP growth on a commercial, polyethersulfone-based ion exchange membrane in cartridge format. S membrane is as the base membrane. 5,000× magnification of (Left) unmodified commercial chromatography membrane with quaternary amine ligands, and (Right) the same base membrane coated in CaP.

FIG. 4 shows SEM images of the S membrane before and after modification, clearly showing the membrane surface is coated in CaP.

Figure 5:
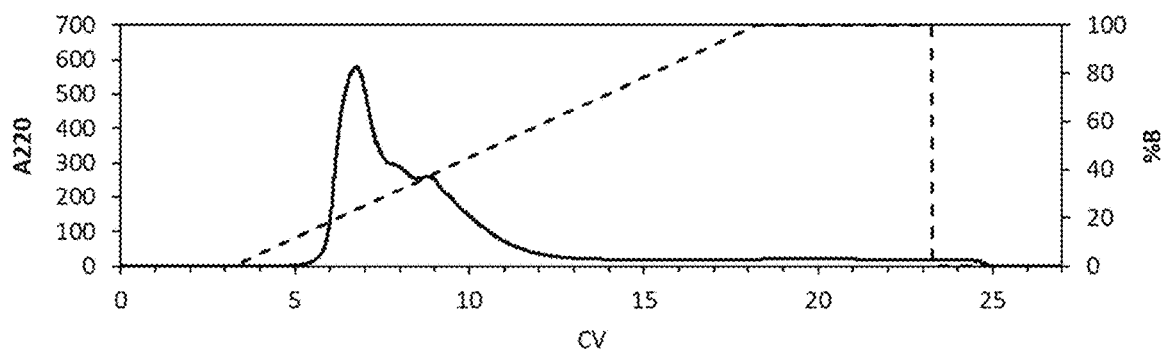
FIG. 5. Composite Q membrane/hydroxyapatite membrane chromatographic trace.

The Q-membrane based composite was tested under the following conditions:
Flow Rate: 2 mL/min
Sample: 25 µL of 5 mg/mL BSA, 0.79 mg/mL Lysozyme, 1.5 mg/mL cytochrome C in 5 mM Sodium Phosphate, pH 6.8
Equilibration: 5 mM Sodium Phosphate, pH 6.8, 10 mL
Elution: Gradient of 5 to 400 mM Sodium Phosphate, pH 6.8 Hold at 400 mM Sodium Phosphate for 5 mL
Elution profiles are shown in FIG. 5.

Example 3

CaP Growth on a Cellulose-Based Commercial S Ion Exchange Membrane in Pumping Format A commercial S ion exchange chromatography membrane based on cellulose with a membrane bed volume of 1 mL was connected to a two-pump chromatography system. Pump A had two different solutions, (A1) 250 mM CaCl2+ 50 mM tris, pH 8 and (A2) 50 mM tris buffer, pH 8. Pump B had two different solutions, (B1) 150 mM Na2PO4 and (B2) 50 mM tris buffer, pH 8. The membrane cartridge underwent 60 cycles of the following:
1. Solution A1 (CaCl2+tris): 7 mL at 1 mL/min.
2. Wash with A2 until the conductivity was less than 1.8 mS/cm.
3. Solution B1 (Na2HPO4): 7 mL at 1 mL/min, followed by a 3 min hold.
4. Wash with B2 until the conductivity was less than 1.8 mS/cm.

Figure 6:
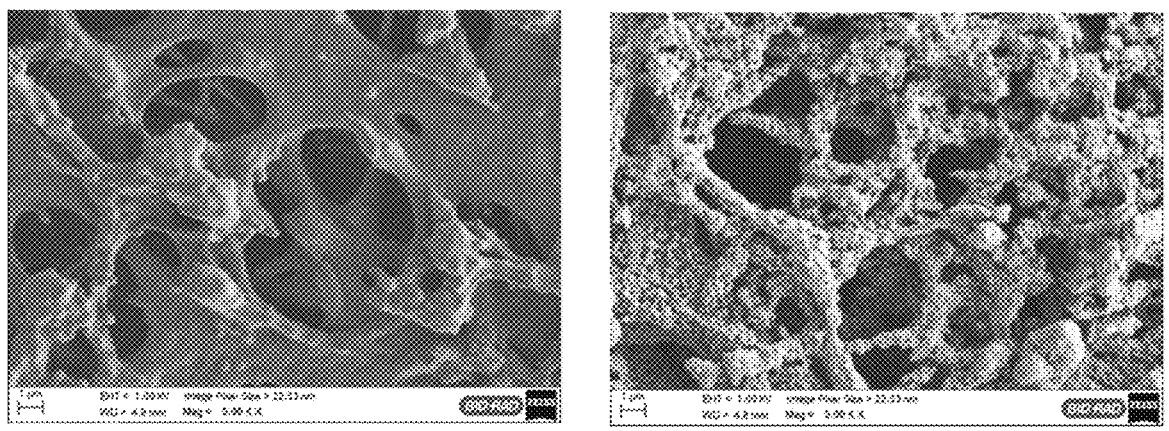
FIG. 6. CaP growth on a cellulose-based commercial S ion exchange membrane in pumping format. 5,000× magnification of (Left) unmodified cellulose based S membrane, and (Right) the same base membrane coated in CaP.

FIG. 6 shows SEM images of the membrane before and after modification, clearly showing the membrane surface is coated in CaP.

Example 4

Phosphorylation of a Commercially Available Cellulose Membrane, Subsequent CaP Deposition in Reactor Format, and Hydroxyapatite Phase Transformation Cellulose membrane (4.17 g) was exposed to 83.4 mL of an aqueous solution containing $NaH_2PO_4$ (4.26 g) and urea (1.55 g) under constant agitation for 30 minutes. While still in the solution, the membranes were dried in a vacuum oven to adsorb the salts to the filter papers. After completely dry, the membranes were baked at about 150° C. for one hour. The phosphorylated membranes were then rinsed with deionized water and dried at ambient pressure and temperature for further use.

The phosphorylated membrane underwent 3 cycles of CaP growth. Each cycle consisted of: (1) 5 min exposure to 250 mM $CaCl_2$ in a reactor with agitation, (2) washes with water using a fritted funnel, (3) 5 minute exposure to 150 mM $Na_2HPO_4$ in a reactor with agitation, and (4) washes with water using a fritted funnel.

The CaP-deposited membranes were exposed to 2M NaOH at 70° C. for four hours. Afterwards, the resulting hydroxyapatite composite membranes were rinsed with deionized water and used in a layered format to separate protein mixtures.

Figure 7:
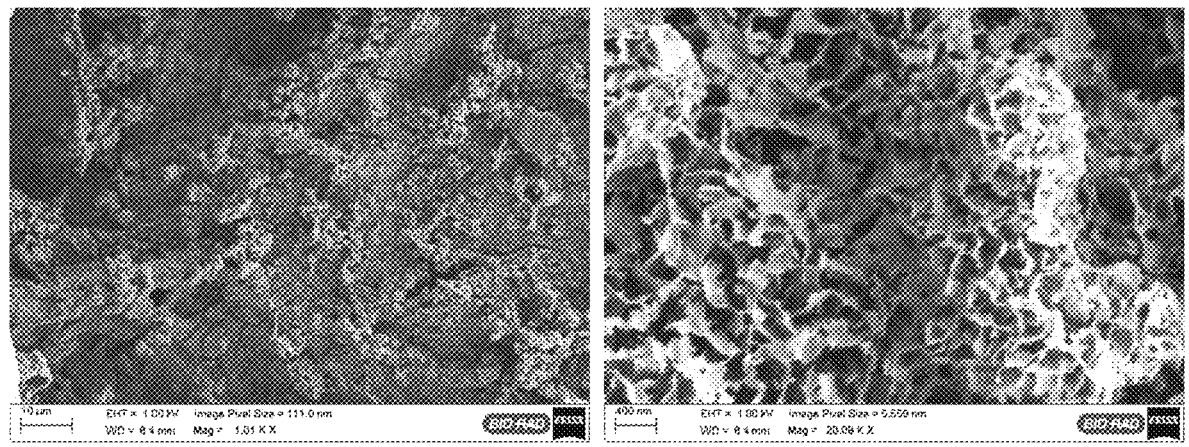
FIG. 7. CaP growth on a cellulose-based commercial S ion exchange membrane in pumping format. Scanning electron microscope images of hydroxyapatite composite membranes. Left: 1,000× magnification. Right: 20,000× magnification.
Figure 8:
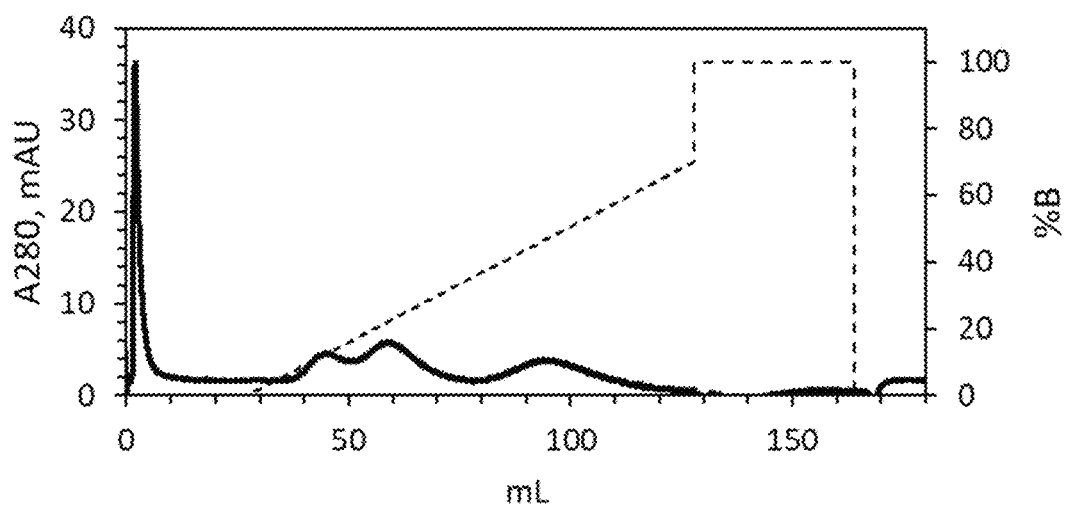
FIG. 8. Chromatogram of protein separation on cellulose/hydroxyapatite composite membrane.

FIG. 7 shows the surface of the CaP coated membrane surface. FIG. 8 shows a chromatographic separation of a protein sample as described below.

The hydroxyapatite membrane was tested under the following conditions:
Flow Rate: 2 mL/min
Membrane Volume 1.8 mL (MV)
Sample: 100 µL of 5 mg/mL BSA, 0.79 mg/mL Lysozyme, 1.5 mg/mL cytochrome C in 5 mM Sodium Phosphate, pH 7.0
Equilibration: 10 mM Sodium Phosphate, pH 7.0, 3 MV
Column Wash: 10 mM Sodium Phosphate, pH 7.0, 15 MV
Elution: Gradient of 10 to 280 mM Sodium Phosphate, pH 6.8, 56 MV Hold at 400 mM Sodium Phosphate for 20 MV

We claim:

1. A hydroxyapatite (HA)-coated substrate made by a method comprising:
   a) contacting a solid porous substrate comprising a hydroxyl group, amine group, quaternary amine group, aldehyde group, azide group, alkyne group, alkene group, phosphate group, sulfonate group, sulfate group, and/or carboxylic acid group with a solution comprising calcium ions, with the proviso that if a substrate comprises positively charged groups it is contacted with a phosphate containing solution and washed prior to contact with a solution comprising calcium ions;
   b) washing the solid substrate contacted with the solution comprising calcium ions with a wash solution;
   c) contacting the washed solid substrate of step b) with a solution comprising phosphate ions to form a solid substrate coated with a brushite form of calcium phosphate;
   d) washing the solid substrate of step c) with a solution to form a brushite-coated substrate; and
   e) optionally contacting the solid substrate of step d) with a solution comprising calcium ions and repeating steps b), c), and d); and
   f) treating the brushite coated substrate with a base to form a HA-coated substrate, with the proviso that the substrate is not a particulate substrate;
   wherein the solid porous substrate comprises:
      i) cellulose, nitrocellulose, nylon, glass, methacrylate, polystyrene, polyethersulfone, or mixtures thereof; or
      ii) glass, metal, a metallic alloy, nylon, polystyrene, cellulose, polyethersulfone, or nitrocellulose.

2. A hydroxyapatite (HA)-coated substrate made by a method comprising:

a) contacting a solid porous substrate comprising positively charged groups with a solution comprising phosphate ions;

b) washing the solid porous substrate contacted with the solution comprising phosphate ions;

c) contacting the solid porous substrate of step b) with a solution comprising calcium ions;

d) washing the solid substrate contacted with the solution comprising calcium ions with a wash solution;

e) contacting the washed solid substrate of step b) with a solution comprising phosphate ions to form a solid substrate coated with a brushite form of calcium phosphate;

f) washing the solid substrate of step c) with a solution to form a brushite-coated substrate; and g) optionally repeating steps c), d), e), and f); and h) treating the brushite coated substrate with a base to form a HA-coated substrate, with the proviso that the substrate is not a particulate substrate.

3. The HA-coated substrate of claim 2, wherein when step 2g) is repeated, it is repeated Y times, where Y is any integer between 1 and 5000.

4. The HA-coated substrate of claim 3, wherein Y is an integer between 1 and 20.

5. The HA-coated substrate of claim 1, wherein when step 1e) is repeated, it is repeated Y times, where Y is any integer between 1 and 5000.

6. The HA-coated substrate of claim 5, wherein Y is an integer between 1 and 20.

7. The HA-coated substrate of claim 1, wherein the substrate comprises cellulose, nitrocellulose, nylon, glass, methacrylate, polystyrene, polyethersulfone, or mixtures thereof.

8. The HA-coated substrate of claim 1, wherein the substrate is macroporous.

9. The HA-coated substrate of claim 1, wherein the substrate has a pore diameter of about 1 to about 100 microns.

10. The HA-coated substrate of claim 1, wherein the substrate is washed with water.

11. The HA-coated substrate of claim 1, wherein the substrate comprises a sulfate group.

12. The HA-coated substrate of claim 1, wherein the substrate comprises a carboxylate group.

13. The HA-coated substrate of claim 1, wherein the substrate comprises a phosphate group.

14. The HA-coated substrate of claim 1, wherein the solution comprising phosphate ions is a sodium salt of phosphoric acid ($Na_2HPO_4$).

15. The HA-coated substrate of claim 1, wherein the solution comprising calcium ions is $CaCl_2$.

16. The HA-coated substrate of claim 1, wherein the calcium solution has a concentration between about 10 mM and about 1000 mM.

17. The HA-coated substrate of claim 1, wherein the phosphate solution has a concentration between about 10 mM to about 1000 mM.

18. The HA-coated substrate of claim 1, wherein brushite is converted to HA by treating the brushite-coated substrate with NaOH.

19. The HA-coated substrate of claim 18, wherein the brushite-coated substrate is treated with NaOH and heated to a temperature of about 55° C. to about 100° C.

20. A chromatography material comprising a HA-coated substrate according to claim 1.

21. A method of performing chromatography, the method comprising:

contacting a sample comprising a target molecule to a HA-coated substrate according to claim 1 under conditions such that the target is not captured by the HA-coated substrate; and collecting the target molecule from eluate that has flowed through the of HA-coated substrates.

22. A method of performing chromatography, the method comprising:

contacting a sample comprising a target molecule to a HA-coated substrate according to claim 1 under conditions such that the target molecule is captured by the HA-coated substrate;

optionally washing the HA-coated substrates with a buffer; and eluting and collecting the target molecule.

23. A method of making a hydroxyapatite (HA)-coated substrate comprising:

a) contacting a solid porous substrate comprising a hydroxyl group, amine group, quaternary amine group, aldehyde group, azide group, alkyne group, alkene group, phosphate group, sulfonate group, sulfate group, and/or carboxylic acid group with a solution comprising calcium ions;

b) washing the solid substrate contacted with solution of calcium ions with a wash solution;

c) contacting the washed solid substrate of step b) with a solution comprising phosphate ions to form a solid substrate coated with a brushite form of calcium phosphate;

d) washing the solid substrate of step c) with a solution to form a brushite-coated substrate; and e) optionally repeating steps b), c), and d); and f) treating the brushite coated substrate with a base to form a HA-coated substrate, with the proviso that the substrate is not a particulate substrate.

* * * * *